US012586507B2

(12) United States Patent
Park et al.

(10) Patent No.: US 12,586,507 B2
(45) Date of Patent: Mar. 24, 2026

(54) DISPLAY DEVICE FOR ADJUSTING GAMMA VOLTAGE AND METHOD FOR OPERATING THE SAME

(71) Applicant: MagnaChip Semiconductor, Ltd., Cheongju-si (KR)

(72) Inventors: Jusang Park, Cheongju-si (KR); Hyoungkyu Kim, Cheongju-si (KR)

(73) Assignee: MagnaChip Semiconductor, Ltd., Cheongju-si (KR)

( * ) Notice: Subject to any disclaimer, the term of this patent is extended or adjusted under 35 U.S.C. 154(b) by 0 days.

(21) Appl. No.: 18/903,502

(22) Filed: Oct. 1, 2024

(65) Prior Publication Data

US 2025/0252889 A1 Aug. 7, 2025

(30) Foreign Application Priority Data

Feb. 1, 2024 (KR) ........................ 10-2024-0015712

(51) Int. Cl.
*G09G 3/20* (2006.01)

(52) U.S. Cl.
CPC ... *G09G 3/2092* (2013.01); *G09G 2310/0291* (2013.01); *G09G 2320/0233* (2013.01); *G09G 2320/0673* (2013.01); *G09G 2330/028* (2013.01)

(58) Field of Classification Search
CPC ......... G09G 3/2092; G09G 2310/0291; G09G 2320/0233; G09G 2320/0673; G09G 2330/028; G09G 3/3696; G09G 3/2007; G09G 3/3225; G09G 2320/0276
See application file for complete search history.

(56) References Cited

U.S. PATENT DOCUMENTS 11,151,928 B2 * 10/2021 Lee ......................... G09F 9/301
2020/0211457 A1 * 7/2020 Kim ..................... G09G 3/3233
2020/0251033 A1 * 8/2020 Ma ........................... G09G 3/20
2021/0280138 A1 * 9/2021 Yum .................... G09G 3/3291

FOREIGN PATENT DOCUMENTS

KR 10-2020-0082744 A 7/2020

* cited by examiner

*Primary Examiner* — Jose R Soto Lopez
(74) *Attorney, Agent, or Firm* — NSIP Law

(57) ABSTRACT

The display device includes a display panel including a plurality of pixels; a driver IC configured to convert digital data corresponding to an input image to an analog voltage using a gamma voltage, and to supply the analog voltage to the plurality of pixels; and a power supply configured to supply a pixel driving voltage to the display panel and the driver IC. The driver IC includes a weight selector configured to select a weight for adjusting the gamma voltage based on a change amount of the pixel driving voltage supplied from the power supply; and a gamma reference voltage generating unit configured to generate a gamma reference voltage based on the selected weight.

17 Claims, 9 Drawing Sheets

FIG. 5

510 401 511 411 513

| GVA_WEIGHT[2:0] | GVA_VREGT_VR | GVA_VREGB_VR |
|---|---|---|
| "LXX" (Default)(X1.0) | SET1 | SET2 |
| "HLL"(X0.6) | SET1 + 2α | SET2 - 2α |
| "HLH"(X0.8) | SET1 + α | SET2 - α |
| "HHL"(X1.2) | SET1 - α | SET2 + α |
| "HHH"(X1.4) | SET1 - 2α | SET2 + 2α |

521 523

DISPLAY DEVICE FOR ADJUSTING GAMMA VOLTAGE AND METHOD FOR OPERATING THE SAME

CROSS REFERENCE TO RELATED APPLICATION

This application claims the benefit under 35 U.S.C. § 119(a) of Korea Patent Application No. 10-2024-0015712, filed on Feb. 1, 2024, the entire disclosure of which is incorporated herein by reference for all purposes.

BACKGROUND

1. Field

The following description relates to a display device configured to adjust a gamma voltage and a method for operating the same.

2. Discussion of Related Art

The statements in this section merely provide background information related to the present disclosure and do not necessarily constitute prior art.

Generally, a display device includes a display panel and a driver integrated circuit (IC). The driver IC is a circuit configured to drive a display panel including a pixel array, and includes a gate driving driver and a source driving driver. The gate driving driver supplies a scan signal (or gate signal) to a gate line connected to each pixel of the pixel array. The source driving driver includes a digital-to-analog converter (DAC) configured to convert digital image data corresponding to an input image to an analog voltage, and to supply the converted analog voltage to a data line connected to each pixel of the pixel array.

Each pixel in the pixel array of the display panel is supplied with a pixel driving voltage via a power line, and a scan signal and analog voltage via a gate line and a data line to enable the display of the image according to the analog data.

The pixel driving voltage supplied to each pixel may change depending on the load inside the display panel and/or outside the display panel, and the changed pixel driving voltage may affect the luminance of each pixel. For example, even if the analog voltage supplied to each pixel is the same, a change in the pixel driving voltage may cause a change in the luminance of each pixel. Therefore, there is a need for a measure to minimize the change in the luminance caused by a pixel driving voltage that changes depending on a load inside and/or outside the display panel.

Accordingly, various embodiments of the present disclosure disclose a display device configured to adjust a gamma voltage of a digital-to-analog converter (DAC) based on a change in a pixel driving voltage, and a method of operating the display device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a display device includes a display panel including a plurality of pixels; a driver IC configured to convert digital data corresponding to an input image to an analog voltage using a gamma voltage, and to supply the analog voltage to the plurality of pixels; and a power supply configured to supply a pixel driving voltage to the display panel and the driver IC. The driver IC may include a weight selector configured to select a weight for adjusting the gamma voltage based on a change amount of the pixel driving voltage supplied from the power supply; and a gamma reference voltage generating unit configured to generate a gamma reference voltage based on the selected weight.

The gamma reference voltage generating unit may include a weight circuit configured to boost or reduce the pixel driving voltage by a specified multiple based on the selected weight; and a gamma reference voltage generator configured to generate the gamma reference voltage based on the boosted or reduced pixel driving voltage, a preset offset voltage, and a reference voltage corresponding to the selected weight.

The reference voltage may be determined based on a table indicating at least one reference voltage corresponding to the selected weight.

The weight circuit may include a buffer configured to buffer the preset offset voltage; a voltage divider circuit configured to divide the pixel driving voltage using a plurality of series-connected resistor elements; a multiplexer connected to the voltage divider circuit and configured to select one of the divided pixel driving voltage from the voltage divider circuit according to a first control signal generated based on the selected weight and output the selected pixel driving voltage; a first switch connected between the voltage divider circuit and the gamma reference voltage generator and configured to be turned on or off by a second control signal generated based on the selected weight; and a second switch connected between the multiplexer and the gamma reference voltage generator and configured to be turned on or off by the second control signal.

The second control signal may selectively turn on one of the first switch and the second switch.

The gamma reference voltage generator may include a first gamma reference voltage generator configured to generate a first gamma reference voltage based on the boosted or reduced pixel driving voltage, the preset offset voltage and a first reference voltage corresponding to the selected weight; and a second gamma reference voltage generator configured to generate a second gamma reference voltage based on the boosted or reduced pixel driving voltage, the preset offset voltage and a second reference voltage corresponding to the selected weight.

The first gamma reference voltage may be an upper limit value of the gamma voltage, and the second gamma reference voltage may be a lower limit value of the gamma voltage.

The weight may be determined by a difference between the pixel driving voltage output from the power supply and the pixel driving voltage input to the driver IC.

The weight may be determined by a difference between the pixel driving voltage input to the driver IC and the pixel driving voltage input to the display panel.

The driver IC may further include a gamma voltage output unit configured to generate and output the gamma voltage based on the gamma reference voltage.

In another general aspect, a method for operating a display device includes selecting a weight for adjusting a gamma voltage of a digital-to-analog converter (DAC) based on a change amount of a pixel driving voltage supplied from a power supply; generating a gamma reference voltage which is used to generate the gamma voltage based on the selected weight; and adjusting the gamma voltage using the generated gamma reference voltage.

The generating of the gamma reference voltage may include boosting or reducing the pixel driving voltage by a specified multiple based on the selected weight; and generating the gamma reference voltage based on the boosted or reduced pixel driving voltage, a preset offset voltage, and a reference voltage corresponding to the selected weight.

The pixel driving voltage may be boosted or reduced by the specified multiple using a voltage divider circuit including a plurality of series-connected resistor elements and configured to divide the pixel driving voltage, and the voltage divider circuit is connected to a multiplexer.

The multiplexer may be configured to operate according to a control signal generated based on the selected weight.

The generating of the gamma reference voltage may include generating a first gamma reference voltage based on the boosted or reduced pixel driving voltage, the preset offset voltage, and a first reference voltage corresponding to the selected weight; and generating a second gamma reference voltage based on the boosted or reduced pixel driving voltage, the preset offset voltage, and a second reference voltage corresponding to the selected weight.

The first gamma reference voltage may be an upper limit value of the gamma voltage, and the second gamma reference voltage may be a lower limit value of the gamma voltage.

The selecting of the weight may include determining the weight based on a difference between the pixel driving voltage output from the power supply and the pixel driving voltage input to a driver IC.

The selecting of the weight may include determining the weight based on a difference between the pixel driving voltage input to a driver IC and the pixel driving voltage input to a display panel.

The reference voltage may be determined based on a table indicating at least one reference voltage corresponding to each weight.

According to various embodiments of the present disclosure, filtering against certain noise can be accomplished in a display device by controlling the gate-source voltage of a pixel driving transistor by adjusting the gamma voltage of a DAC based on a change amount of the pixel driving voltage in the display device. This can minimize changes in luminance due to changes in the pixel driving voltage.

Other features and aspects will be apparent from the following detailed description, the drawings, and the claims.

BRIEF DESCRIPTION OF THE DRAWINGS

FIG. 5 illustrates an example of a reference voltage table per GVA weight according to various embodiments of the present disclosure.

Figure 1:
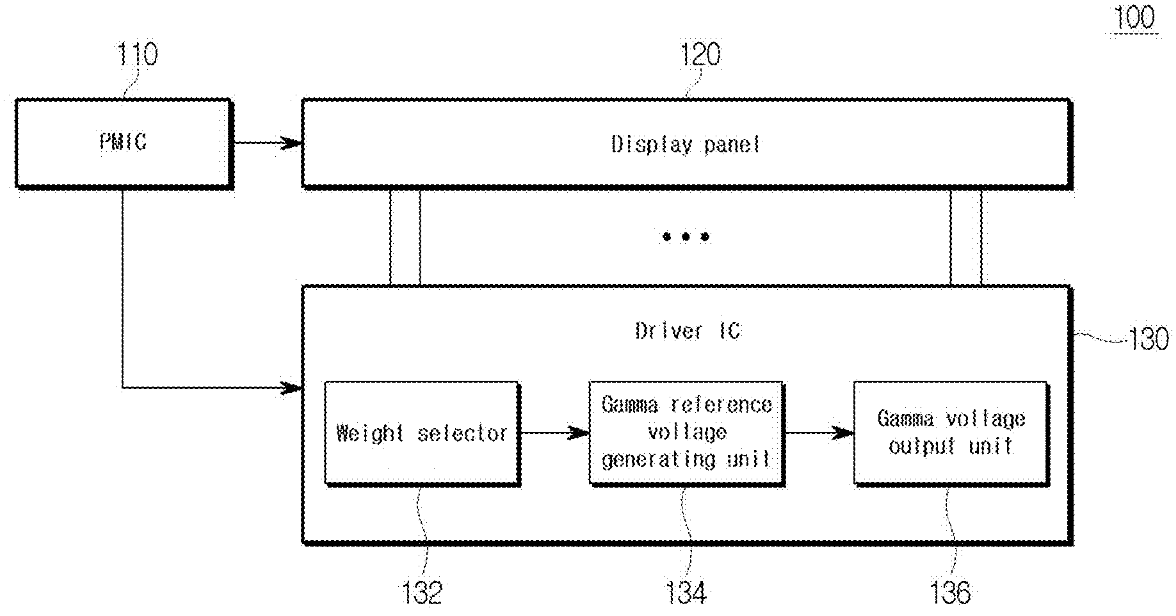
FIG. 1 illustrates a block diagram of a display device according to various embodiments of the present disclosure.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto.

Throughout the specification, when a component or element is described as being "on", "connected to," "coupled to," or "joined to" another component, element, or layer it may be directly (e.g., in contact with the other component or element) "on", "connected to," "coupled to," or "joined to" the other component, element, or layer or there may reasonably be one or more other components, elements, layers intervening therebetween. When a component or element is described as being "directly on", "directly connected to," "directly coupled to," or "directly joined" to another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

Due to manufacturing techniques and/or tolerances, variations of the shapes shown in the drawings may occur. Thus, the examples described herein are not limited to the specific shapes shown in the drawings, but include changes in shape that occur during.

Methods or algorithm steps described relative to some embodiments of the present invention may be directly implemented by hardware and software modules that are executed by a processor or may be directly implemented by a combination thereof. The software module may be resident on a RAM, a flash memory, a ROM, an EPROM, an EEPROM, a resistor, a hard disk, a removable disk, a CD-ROM, or any other type of record medium known to those skilled in the art. An exemplary record medium is coupled to a processor and the processor can read information from the record medium and can record the information in a storage medium. In another way, the record medium may be integrally formed with the processor. The processor and the record medium may be resident within an application specific integrated circuit (ASIC).

Unless otherwise defined, all terms, including technical and scientific terms, used herein have the same meaning as commonly understood by one of ordinary skill in the art to which this disclosure pertains specifically in the context on an understanding of the disclosure of the present application. Terms, such as those defined in commonly used dictionaries, are to be interpreted as having a meaning that is consistent with their meaning in the context of the relevant art and specifically in the context of the disclosure of the present application, and are not to be interpreted in an idealized or overly formal sense unless expressly so defined herein.

Figure 2:
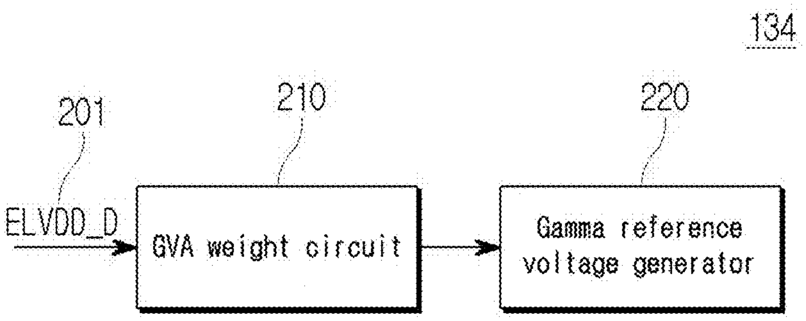
FIG. 2 illustrates a block diagram of a gamma reference voltage generating unit according to various embodiments of the present disclosure.
Figure 3:
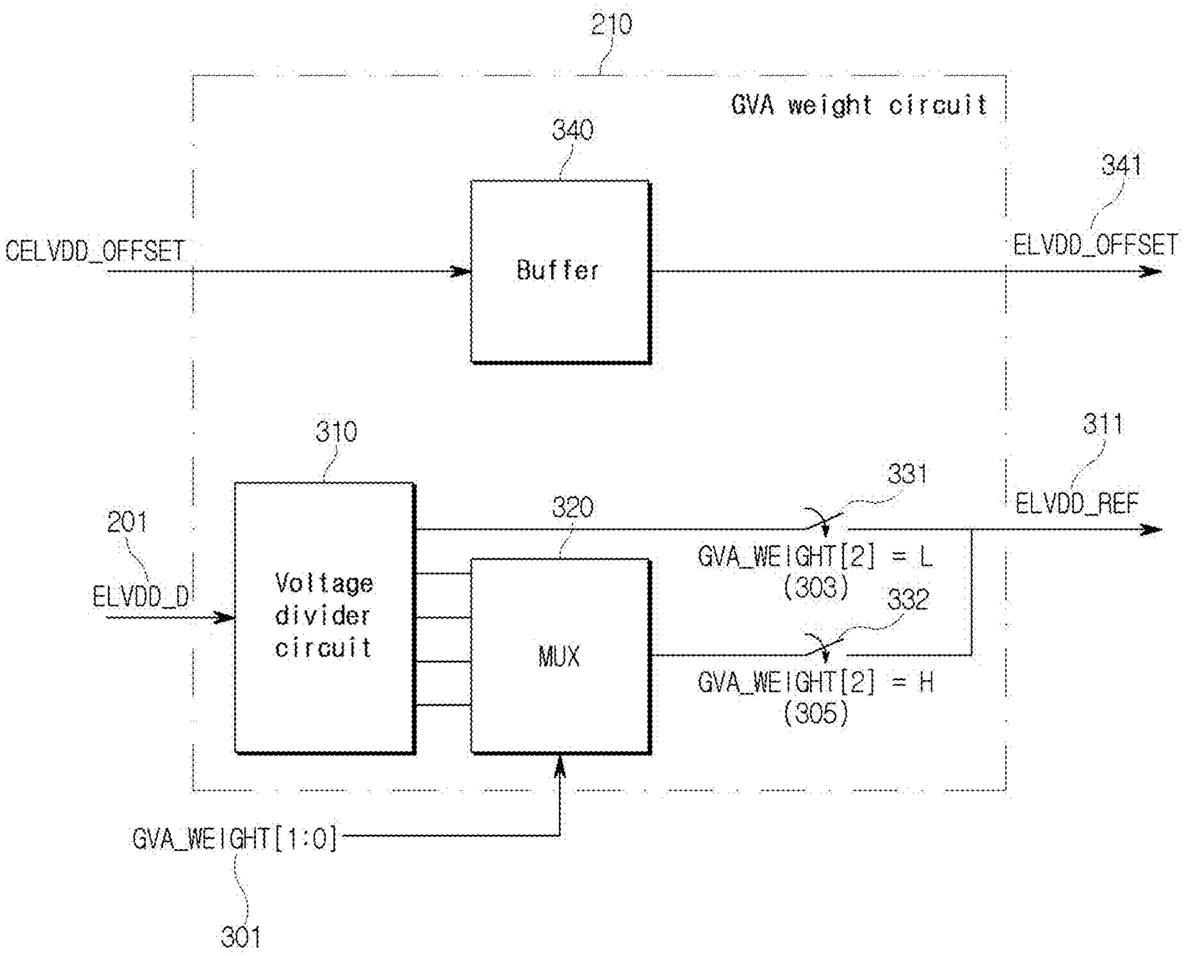
FIG. 3 illustrates a configuration diagram of a gamma voltage adjustment (GVA) weight circuit according to various embodiments of the present disclosure.
Figure 4:
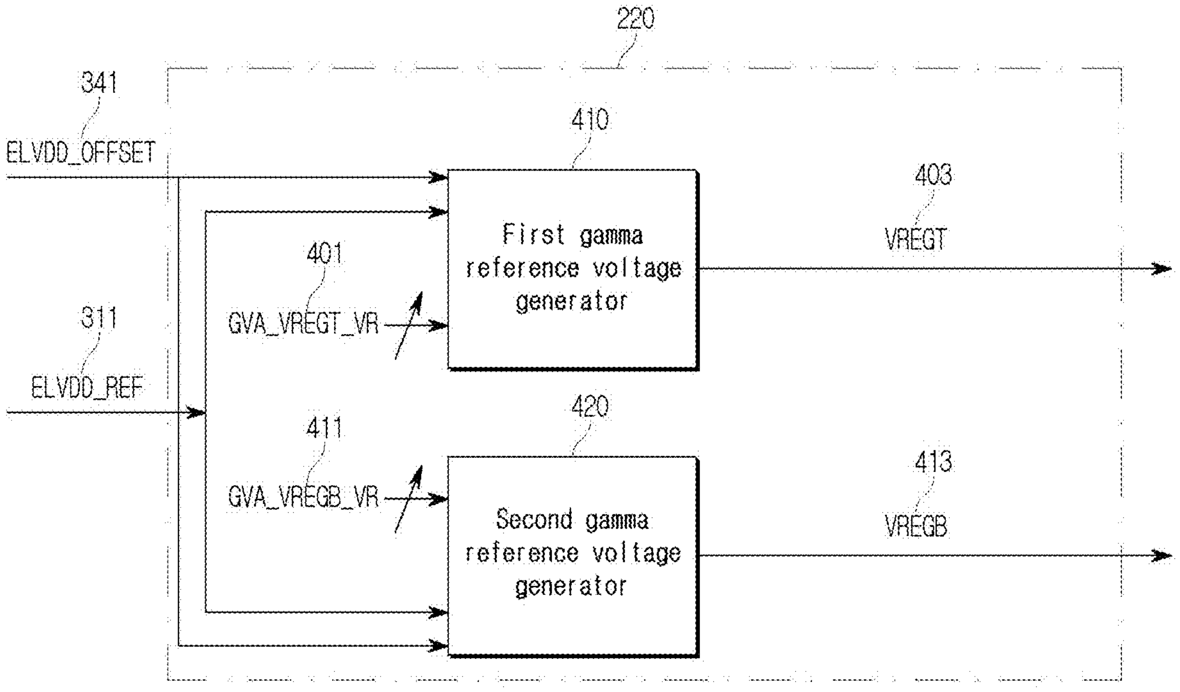
FIG. 4 illustrates a configuration diagram of a gamma voltage generator according to various embodiments of the present disclosure.

FIG. 1 illustrates a block diagram of a display device according to various embodiments of the present disclosure. A configuration of a display device illustrated in FIG. 1 is an example. For example, one component illustrated in FIG. 1 may be omitted, and another component not illustrated in FIG. 1 may be further added. In the description hereinafter, each component illustrated in the drawings may be implemented into a single chip, or may be implemented as each different chip. Hereinafter, some component illustrated in FIG. 1 will be described with reference to FIGS. 2 to 5. FIG. 2 illustrates a block diagram of a gamma reference voltage generating unit according to various embodiments of the present disclosure. FIG. 3 illustrates a configuration diagram of a gamma voltage adjustment (GVA) weight circuit according to various embodiments of the present disclosure. FIG. 4 illustrates a configuration diagram of a gamma reference voltage generator according to various embodiments of the present disclosure. FIG. 5 illustrates an example of a reference voltage table per GVA weight according to various embodiments of the present disclosure.

Referring to FIG. 1, the display device 100 may include a power supply 110, a display panel 120, and a driver IC 130.

The power supply 110 may be a power management integrated circuit (PMIC) configured to manage power for operation of the display device 100. For example, the power supply 110 may provide a pixel driving voltage (ELVDD) to the display panel 120, and the driver IC 130.

In addition, the power supply 110 may additionally provide other voltages necessary to adjust a gamma voltage. To this end, the power supply 110 may have a plurality of PMICs. In addition, a voltage supplied from the power supply 110 may be changed in response to an external control signal.

The display panel 120 includes a pixel array and may display an input image. In an example, the pixel array may include pixels including a red (R) sub-pixel, a green (G) sub-pixel, and a blue (B) sub-pixel. Each pixel may include a liquid crystal capacitor and a thin film transistor, and the pixels may be arranged in a matrix form. A source of the thin film transistor included in each pixel may be connected to a data line connected to a source driving driver (not illustrated) of the driver IC 130, and a gate of the thin film transistor may be connected to a gate line connected to a gate driving driver (not illustrated). Each pixel may display an input image according to a scan signal applied from a gate driving driver (not illustrated) through a gate line and an analog voltage applied from a source driving driver (not illustrated) through a data line. In an example, when the scan signal is applied through the gate line, each pixel may be electrically connected to the data line to receive the analog voltage. Each pixel may allow a corresponding light emitting device to emit light with a current corresponding to the input analog voltage.

The display panel 120 may receive a pixel driving voltage (ELVDD) from the power supply 110 through a power line. In this case, the pixel driving voltage supplied from the power supply 110 may be applied to each pixel of the pixel array in the display panel 120.

In an example, various loads may exist in the power line to which the pixel driving voltage (ELVDD) is supplied. For example, at least one resistor element may be present in the power line between the power supply 110 and the display panel 120, or a noise component may be present due to external influences. In this case, the pixel driving voltage (ELVDD) supplied from the power supply 110 to the display panel 120 may change (e.g., voltage dips or rises) due to loads or noise present on the power line. A change in the pixel driving voltage (ELVDD) may affect light emission luminance of the Organic Light Emitting Diode (OLED) of each pixel. For example, the luminance of light emitted by OLED of each pixel in the display panel 120 may be proportional to a current flowing through the light emitting devices. In this case, the current flowing through the light emitting devices may change due to a pixel driving voltage applied through the power line as well as an analog voltage applied through the data line. Accordingly, when the pixel driving voltage changes, even though the analog voltages applied through the data line of the light emitting devices are the same, the current flowing through the light emitting devices can change, causing a change in the luminance of the light emitted from the light emitting devices. Accordingly, various embodiments of the present disclosure will describe a method for compensating for luminance when the pixel driving voltage supplied to the display panel 120 from the power supply 110 changes.

The driver IC 130 may include a gate driving driver (not illustrated) and a source driving driver (not illustrated).

The gate driving driver (not illustrated) may be connected to each of pixels of the display panel 120 through gate lines. The gate driving driver (not illustrated) may drive the pixels by supplying a scan signal to the pixels through the gate lines.

The source driving driver (not illustrated) may be connected to each of pixels of the display panel 120 through data lines. The source driving driver (not illustrated) may include a digital-to-analog converter (DAC, not illustrated) to convert digital video data to an analog voltage. The source driving driver (not illustrated) may supply the converted analog voltage to each of the pixels through the data lines.

The source driving driver (not illustrated) may use a gamma voltage when the digital video data is converted to the analog voltage.

When the display device is driven, the luminance should be in linear proportion to the digital video data. However, a pixel element may not operate linearly due to the characteristics of the pixel element and noises occurring in the vicinity. The analog voltage generated by the DAC may change based on the characteristics of the pixel element so that the luminance can be generated to be linearly proportional to digital video data. The gamma voltage may be a reference voltage that allows the analog voltage to be generated so that the luminance is linearly proportional to the digital video data.

The gamma voltage can be determined, fixed, and then released through pre-release testing to reflect the device characteristics of each product.

The present disclosure proposes a method for adjusting a gamma voltage that can be fixed and released in response to changes in the pixel driving voltage.

According to various embodiments of the present disclosure, the driver IC 130 may adjust the gamma voltage of the DAC of the source driving driver.

The driver IC 130 may include a weight selector 132 that selects a weight for adjusting a gamma voltage according to the amount of change in the pixel driving voltage (hereinafter referred to as a "GVA weight") and an offset voltage for additionally correcting the gamma voltage, and a gamma reference voltage generating unit 134 that generates a gamma voltage of the DAC by using the selected weight and the offset voltage.

In an example, the weight selector 132 may select a gamma voltage adjustment (GVA) weight based on a difference ($\pm\alpha$) between the pixel driving voltage (e.g., ELVDD) output from the power supply 110 and the pixel driving voltage (e.g., ELVDD_D=(ELVDD$\pm\alpha$)) input to the driver IC 130.

In another example, the weight selector 132 may select a GVA weight based on a difference between the pixel driving voltage (e.g., ELVDD_D=(ELVDD$\pm\alpha$)) input to the driver IC 130 after being changed due to a load between the power supply 110 and the driver IC 130 and a pixel driving voltage (e.g., ELVDD_P=(ELVDD$\pm 2\alpha$)) input to the display panel 120 after being changed due to a load between the power supply 110 and the display panel 120.

The GVA weight may be selected from, for example, any one of 0.6, 0.8, 1.0, 1.2, and 1.4. This is merely an example, and the value of the GVA weight in various embodiments of the present disclosure is not necessarily limited thereto.

The weight selector 132 may select the offset voltage for additionally correcting an offset present in the gamma voltage. In an example, the weight selector 132 may select one of the set voltages. In this case, the set voltages may be, but is not limited to, −5 mV, 0V, or 5 mV, and may recognize an offset that exists in the gamma voltage and actively set an offset voltage.

The weight selector 132 may generate a control signal indicating the selected GVA weight and a control signal indicating the selected offset voltage.

The weight selector 132 may provide the generated control signal indicating the GVA weight to the gamma reference voltage generating unit 134. The control signal indicating the GVA weight may be GVA_WEIGHT[2:0]. For example, the GVA_WEIGHT[2:0] signal may be generated as shown in Table 1 below.

TABLE 1

| GVA weight | GVA_WEIGHT[2:0] |
|---|---|
| 1 (default) | LXX |
| 0.6 | HLL |
| 0.8 | HLH |
| 1.2 | HHL |
| 1.4 | HHH |

As shown in Table 1, the weight selector 132 may generate a GVA_WEIGHT[2:0] signal of "LXX" when 1, that is the default GVA weight, is selected, and generate a GVA WEIGHT[2:0] signal of "HLL" when 0.6 is selected as the GVA weight. Here, the most significant bit value of GVA_WEIGHT[2:0] may indicate whether the selected GVA weight is a default weight. For example, when the most significant bit value of GVA_WEIGHT[2:0] is "L", it may indicate that the selected GVA weight is the default GVA weight, and when the most significant bit value of GVA_WEIGHT[2:0] is "H", it may indicate that the selected GVA weight is not the default GVA weight. In addition, the weight selector 132 may provide a control signal indicating the generated offset voltage to the power supply 110. The power supply 110 may provide a voltage including the offset voltage to the gamma reference voltage generating unit 134 based on the received control signal.

According to various embodiments, as illustrated in FIG. 2, the gamma reference voltage generating unit 134 includes a GVA weight circuit 210 and a gamma reference voltage generator 220, so that the gamma reference voltage generating unit 134 may generate and output a gamma voltage of the DAC using a selected GVA weight and a selected offset voltage.

According to various embodiments, the GVA weight circuit 210 may boost or reduce the incoming pixel driving voltage (ELVDD_D) 201 based on the selected GVA weight. For example, the GVA weight circuit 210 may boost or reduce the pixel driving voltage (ELVDD_D) 201 by a specified multiple based on the GVA_WEIGHT[2:0] signal generated by the weight selector 132. In an example, the pixel driving voltage (ELVDD_D) 201 may refer to a voltage (ELVDD±Δ) obtained when the initial pixel driving voltage (ELVDD) output from the power supply 110 is varied by a first variation ±Δ by a load. In an example, the specified multiple may be specified as 1/βtimes the GVA weight corresponding to the GVA_WEIGHT[2:0] signal. For example, if β is 4, the specified multiple could be 0.25 if the GVA WEIGHT[2:0] signal is "LXX" because the default weight of 1 is selected. When the GVA_WEIGHT[2:0] signal generated by the weight selector 132 is "LXX", the GVA weight circuit 210 may boost or reduce the input pixel driving voltage (ELVDD_D) by 0.25 times (ELVDD_D×0.25) and output the input pixel driving voltage (ELVDD_D). As another example, if the GVA WEIGHT[2:0] signal is "HLH", this means that a weight of 0.8 has been selected, so the specified multiple can be 0.2. If the GVA_WEIGHT[2:0] signal generated by the weight selector 132 is "HLH", the GVA weight circuit 210 may boost or reduce the input pixel driving voltage (ELVDD_D) by 0.2 times (ELVDD_D×0.2) and output the input pixel driving voltage (ELVDD_D).

In an example, the GVA weight circuit 210 includes a voltage divider circuit 310, a multiplexer (MUX) 320, a first switch 331, a second switch 332, and a buffer 340 as shown in FIG. 3.

The voltage divider circuit 310 may include a plurality of resistor elements connected in series between the pixel driving voltage input terminal and a ground. The voltage divider circuit 310 may divide the pixel driving voltage (ELVDD_D) 201 using the plurality of series-connected resistor elements. The voltage divider circuit 310 may be configured to provide, for example, (×0.25) ELVDD_D to the first switch 331, (×0.15) ELVDD_D, (×0.2) ELVDD_D, (×0.3) ELVDD_D, and (×0.35) ELVDD_D to the MUX 320.

The MUX 320 may be connected to the voltage divider circuit 310 to output any of the voltages that the voltage divider circuit 310 outputs after voltage division. For example, the MUX 320 may select one of the voltages output from the voltage divider circuit 310 according to a first control signal generated based on the GVA weight, and output the selected voltage. The first control signal may be a GVA_WEIGHT[1:0] 301, which is a signal corresponding to the lower 2 bits among the GVA_WEIGHT[2:0] signals. Here, voltages provided from the voltage divider circuit 310 and output from the MUX 320 may be (×0.15) ELVDD_D, (×0.2) ELVDD_D, (×0.3) ELVDD_D, and (×0.35) ELVDD_D. For example, the MUX 320 may be set to select and output (×0.15) ELVDD_D when "GVA WEIGHT[1:0]=LL", select and output (×0.2) ELVDD_D when "GVA WEIGHT[1:0]=LH", select and output (×0.3) ELVDD_D when "GVA WEIGHT[1:0]=HL", and select and output (×0.35) ELVDD_D when "GVA WEIGHT[1:0]=HH".

The first switch 331 may be connected between the voltage divider circuit 310 and the gamma reference voltage generator 220 and may be turned on or off by a second control signal generated based on the GVA weight. The second control signal may be GVA_WEIGHT[2], which is a signal corresponding to the most significant bit of the GVA_WEIGHT[2:0] signal. When GVA_WEIGHT[2] is "L", the first switch 331 may be turned on to provide the boosted or reduced pixel driving voltage provided from the voltage divider circuit 310 to the gamma reference voltage generator 220. Here, the boosted or reduced pixel driving voltage provided from the voltage divider circuit 310 may be (×0.25) ELVDD_D.

The second switch 332 may be connected between the MUX 320 and the gamma reference voltage generator 220 and may be turned on or off by a second control signal generated based on the GVA weight. The second control signal may be GVA_WEIGHT[2], which is a signal corresponding to the most significant bit of the GVA_WEIGHT[2:0] signal. When GVA_WEIGHT[2] is "H", the second switch 332 may be turned on to provide the boosted or reduced pixel driving voltage provided from the MUX 320 to the gamma reference voltage generator 220. The boosted or reduced pixel driving voltage provided by the MUX 320 can be one of (×0.15) ELVDD_D, (×0.2) ELVDD_D, (×0.3) ELVDD_D, and (×0.35) ELVDD_D.

The buffer 340 may buffer the offset voltage (CELVDD_OFFSET) provided from the power supply 110 and provide the buffered offset voltage (CELVDD_OFFSET) to the gamma reference voltage generator 220.

According to various embodiments, the gamma reference voltage generator 220 may generate first and second gamma reference voltages to be used in the gamma voltage output unit 136 based on the boosted or reduced pixel driving voltage, the offset voltage (CELVDD_OFFSET), and reference voltages provided from the GVA weight circuit 210. The reference voltages may be selected based on the GVA weight selected by the weight selector 132, and the selected reference voltage may be directly provided from the power supply 110, or the reference voltage may be generated through the internal voltage divider circuit.

In an example, the gamma reference voltage generator 220 may include a first gamma reference voltage generator 410 and a second gamma reference voltage generator 420 as shown in FIG. 4.

The first gamma reference voltage generator 410 may generate and output a first gamma reference voltage (VREGT) 403 based on the boosted or reduced pixel driving voltage (ELVDD_REF) 311, the offset voltage (ELVDD_OFFSET) 341, and a first reference voltage (GVA_VREGT_VR) 401. Here, the offset voltage (ELVDD_OFFSET) 341 may be a voltage obtained by subtracting a required offset voltage from the reference voltage. The reason for this is to prevent the offset voltage (ELVDD_OFFSET) 341 from being a negative number. In addition, the offset voltage is a dramatically low value and providing the offset voltage only may be vulnerable to the noise generation. The first gamma reference voltage (VREGT) 403 is an upper limit value of the gamma reference voltage, and may have a value of the mathematical equation 1 below.

$$VREGT = \beta \times (\text{GVA\_VREGT\_VR} + \text{ELVDD\_REF} - \text{ELVDD\_OFFSET}) \quad \text{[Mathematical equation 1]}$$

For example, the first gamma reference voltage generator 410 may generate the first gamma reference voltage (VREGT) 403 by adding the boosted or reduced pixel driving voltage (ELVDD_REF×β) which has been boosted by β times to the first reference voltage (BxGVA_VREGT_VR), to which the specified coefficient β has been applied, and then subtracting the offset voltage (ELVDD_OFFSET×β), which has been boosted by β times, therefrom.

In the mathematical equation 1, when β is 4 and the boosted or reduced pixel driving voltage (ELVDD_REF) 311 is ELVDD_D*(WGT)/β as described with reference to FIG. 3, and the offset voltage (ELVDD_OFFSET) 341 is (ELVDD–OFFSET)/β, the first gamma reference voltage (VREGT) 403 may be expressed by the mathematical equation 2 below.

$$VREGT = 4 \times \text{GVA\_VREGT\_VR} + \text{ELVDD\_D} * (WGT) - (\text{ELVDD} - \text{OFFSET}) \quad \text{[Mathematical equation 2]}$$

Here, "WGT" may refer to a selected GVA weight.

The second gamma reference voltage generator 420 may generate and output a second gamma reference voltage (VREGB) 413 based on the boosted or reduced pixel driving voltage (ELVDD_REF) 311, the offset voltage (ELVDD_OFFSET) 341, and a second reference voltage (GVA_VREGB_VR) 411. The second gamma reference voltage (VREGB) 413 is a lower limit value of the gamma reference voltage, and may have a value in mathematical equation 3 below.

$$VREGB = \beta \times (\text{GVA\_VREGB\_VR} + \text{ELVDD\_REF} - \text{ELVDD\_OFFSET}) \quad \text{[Mathematical equation 3]}$$

For example, the second gamma reference voltage generator 420 may generate the second gamma reference voltage (VREGB) 413 by adding the pixel driving voltage (ELVDD_REF×β) which has been boosted by β times to the second gamma reference voltage (β×GVA_VREGB_VR), to which the specified coefficient β has been applied, and then subtracting the offset voltage (ELVDD_OFFSET×β), which has been boosted by times, therefrom.

In the mathematical equation 3, when β is 4 and the boosted or reduced pixel driving voltage (ELVDD_REF) 311 is ELVDD_D*(WGT)/β as described with reference to FIG. 3, and the offset voltage (ELVDD_OFFSET) 341 is (ELVDD–OFFSET)/β, the second gamma reference voltage (VREGB) 413 may be expressed by the mathematical equation 4 below.

$$VREGB = 4 \times \text{GVA\_VREGB\_VR} + \text{ELVDD\_D} * (WGT) - (\text{ELVDD} - \text{OFFSET}) \quad \text{[Mathematical equation 4]}$$

Here, "WGT" may refer to a selected GVA weight.

In the description provided above and below, the coefficient β is specified as 4, but the coefficient β is not limited to 4 and may have other values.

In an example, the first reference voltage (GVA_VREGT_VR) 401 and the second reference voltage (GVA_VREGB_VR) 411 may be selected based on a pre-stored table for a reference voltage for each GVA weight as shown in FIG. 5. As shown in FIG. 5, the table containing a reference voltage for each GVA weight may represent a first reference voltage (GVA_VREGT_VR) 401 and a second reference voltage (GVA_VREGB_VR) 411 for each GVA_WEIGHT[2:0] signal 510 corresponding to the selected GVA weight. For example, when the selected GVA weight is 1, the gamma reference voltage generator 220 may select a value of SET1 511 and a value of SET2 513 as the first reference voltages (GVA_VREGT_VR) 401 and the second reference voltage (GVA_VREGB_VR) 411 based on the table containing a reference voltage for each GVA weight illustrated in FIG. 5. The values of SET1 and SET2 may be preset voltage values. As another example, when the selected GVA weight is 1.2, the gamma reference voltage generator 220 may select a value of (SET1−α) 521 as the first reference voltage (GVA_VREGT_VR) 401 and a value of (SET2+α) 523 as the second reference voltage (GVA_VREGB_VR) 411 based on the table containing a reference voltage for each GVA weight in FIG. 5. In an example, "α" may be determined based on a difference between an initial pixel driving voltage (ELVDD) output from the power supply 110 and a pixel driving voltage (ELVDD_D) input to the driver IC 130.

The gamma voltage output unit 136 may generate and output a gamma voltage to be used in the DAC based on the first gamma reference voltage VREGT and the second gamma reference voltage VREGB received from the gamma reference voltage generator 220. The gamma voltage generated by the gamma voltage output unit 136 may be determined based on the first gamma reference voltage VREGT and the second gamma reference voltage VREGB. For example, when the first gamma reference voltage VREGT and the second gamma reference voltage VREGB are changed, the gamma voltage generated by the gamma voltage output unit 136 may also be changed.

In an example, Table 2 to Table 4 show an example of generating the first gamma reference voltage (VREGT) 403 based on the GVA weight and the offset voltage.

Table 2 is an example of the first gamma reference voltage (VREGT) 403 generated according to the GVA weight when the offset voltage is 0V, Table 3 is an example of the first gamma reference voltage (VREGT) 403 generated according to the GVA weight when the offset voltage is 20 mV, and Table 4 is an example of the first gamma reference voltage (VREGT) 403 generated according to the GVA weight when the offset voltage is −20 mV.

TABLE 2

| GVA_ WEIGHT[2:0] | ELVDD_ REF | ELVDD_ OFFSET | GVA_ VREGT_VR | VREGT |
|---|---|---|---|---|
| LXX(Default) | (ELVDD + Δ) × 0.25 | ELVDD/4 | 1.75 V | 7.0 V + (Δ) |
| HLL(×0.6) | (ELVDD + Δ) × 0.15 | ELVDD/4 | 2.21 V | 7.0 V + (0.6Δ) |
| HLH(×0.8) | (ELVDD + Δ) × 0.20 | ELVDD/4 | 1.98 V | 7.0 V + (0.8Δ) |

TABLE 2-continued

| GVA_ WEIGHT[2:0] | ELVDD_ REF | ELVDD_ OFFSET | GVA_ VREGT_VR | VREGT |
|---|---|---|---|---|
| HHL(×1.2) | (ELVDD + Δ) × 0.30 | ELVDD/4 | 1.52 V | 7.0 V + (1.2Δ) |
| HHH(×1.4) | (ELVDD + Δ) × 0.35 | ELVDD/4 | 1.29 V | 7.0 V + (1.4Δ) |

TABLE 3

| GVA_ WEIGHT[2:0] | ELVDD_ REF | ELVDD_ OFFSET | GVA_ VREGT_VR | VREGT |
|---|---|---|---|---|
| LXX(Default) | (ELVDD + Δ) × 0.25 | ELVDD/4 − 0.005 | 1.75 V | 7.02 V + (Δ) |
| HLL(×0.6) | (ELVDD + Δ) × 0.15 | ELVDD/4 − 0.005 | 2.21 V | 7.02 V + (0.6Δ) |
| HLH(×0.8) | (ELVDD + Δ) × 0.20 | ELVDD/4 − 0.005 | 1.98 V | 7.02 V + (0.8Δ) |
| HHL(×1.2) | (ELVDD + Δ) × 0.30 | ELVDD/4 − 0.005 | 1.52 V | 7.02 V + (1.2Δ) |
| HHH(×1.4) | (ELVDD + Δ) × 0.35 | ELVDD/4 − 0.005 | 1.29 V | 7.02 V + (1.4Δ) |

TABLE 4

| GVA_ WEIGHT[2:0] | ELVDD_ REF | ELVDD_ OFFSET | GVA_ VREGT_VR | VREGT |
|---|---|---|---|---|
| LXX(Default) | (ELVDD + Δ) × 0.25 | ELVDD/4 + 0.005 | 1.75 V | 6.98 V + (Δ) |
| HLL(×0.6) | (ELVDD + Δ) × 0.15 | ELVDD/4 + 0.005 | 2.21 V | 6.98 V + (0.6Δ) |
| HLH(×0.8) | (ELVDD + Δ) × 0.20 | ELVDD/4 + 0.005 | 1.98 V | 6.98 V + (0.8Δ) |
| HHL(×1.2) | (ELVDD + Δ) × 0.30 | ELVDD/4 + 0.005 | 1.52 V | 6.98 V + (1.2Δ) |
| HHH(×1.4) | (ELVDD + Δ) × 0.35 | ELVDD/4 + 0.005 | 1.29 V | 6.98 V + (1.4Δ) |

In Table 2 to Table 4, the pixel driving voltage (ELVDD_D) 201 is a value (ELVDD+Δ) obtained by adding the amount of change to an initial pixel driving voltage (ELVDD) (e.g., 4.6V) output from the power supply 110. In addition, when the offset voltage is 0V, 20 mV, or −20 mV, the offset voltage (ELVDD_OFFSET) is ELVDD/4, ELVDD/4−0.005, or ELVDD/4+0.005, respectively. These values are obtained by specifying the coefficient β as 4 in the above description.

Referring to a second row in Table 2, when the selected GVA weight is 1, GVA_WEIGHT[2:0] 510 may be "LXX". In this case, referring to FIG. 3, since GVA_WEIGHT[2] is "L", the first switch 331 of the gamma reference voltage generating unit 134 may be turned on and the second switch 332 may be turned off. Accordingly, the first switch 331 may provide (×0.25) ELVDD_D or (×0.25) (ELVDD+Δ) provided from the voltage divider circuit 310 to the first gamma reference voltage generator 410.

The first gamma reference voltage generator 410 may generate the first gamma reference voltage (VREGT) 403 by using the mathematical equation 1, with an input of (×0.25) (ELVDD+Δ) which is the boosted or reduced pixel driving voltage (ELVDD_REF) 311, ELVDD/4 which is the offset voltage (ELVDD_OFFSET) 341, and 1.75V which is a preset first reference voltage (GVA_VREGT_VR) 401. Referring to the mathematical equation 1, it can be seen that 7.0V+Δ may be obtained as the first gamma reference voltage (VREGT) 403 by using an equation, 4×(1.75+0.25 (ELVDD+Δ)−ELVDD/4)=7.0V+Δ.

Next, referring to a third row in Table 2, when the selected GVA weight is 0.6, GVA_WEIGHT[2:0] 510 may be "HLL". In this case, since GVA_WEIGHT[2] is "H" and GVA_WEIGHT[1:0] (301) is "LL", the first switch 331 of the gamma reference voltage generating unit 134 may be turned off and the second switch 332 may be turned on. In addition, the MUX 320 may receive "LL" as a control signal, and may provide (×0.15) ELVDD_D or (×0.15) (ELVDD+Δ) corresponding to "LL" to the first gamma reference voltage generator 410.

The first gamma reference voltage generator 410 may generate the first gamma reference voltage (VREGT) 403 by using the mathematical equation 1, with an input of (×0.15) (ELVDD+Δ) which is the boosted or reduced pixel driving voltage (ELVDD_REF) 311, ELVDD/4 which is the offset voltage (ELVDD_OFFSET) 341, and 2.21V which is a preset first reference voltage (GVA_VREGT_VR) 401. Referring to the mathematical equation 1, when an initial pixel driving voltage (ELVDD) output from the power supply 110 is 4.6V, 7.0V+0.6Δ may be generated as the first gamma reference voltage (VREGT) 403 by using an equation, 4×(2.21+0.15(ELVDD+Δ)−ELVDD/4)=7.0V+0.64.

When the selected GVA weight in fourth to sixth rows of Table 2 is 0.8, 1.2 or 1.4, the first gamma reference voltage generator 410 may generate 7.0V+(0.8Δ), 7.0V+(1.2Δ), or 7.0V+(1.4Δ) as the first gamma reference voltage (VREGT) 403, respectively, when the value is calculated in the manner described above, as provided in the last row of Table 2.

Referring to a second row in Table 3, when the selected GVA weight is 1, GVA_WEIGHT[2:0] 510 may be "LXX". In this case, referring to FIG. 3, since GVA_WEIGHT[2] is "L", the first switch 331 of the gamma reference voltage generating unit 134 may be turned on and the second switch 332 may be turned off. Accordingly, the first switch 331 may provide (×0.25) ELVDD_D or (×0.25) (ELVDD+Δ) provided from the voltage divider circuit 310 to the first gamma reference voltage generator 410.

The first gamma reference voltage generator 410 may generate the first gamma reference voltage (VREGT) 403 by using the mathematical equation 1, with an input of (×0.25) (ELVDD+Δ) which is the boosted or reduced pixel driving voltage (ELVDD_REF) 311, ELVDD/4−0.005 which is the offset voltage (ELVDD_OFFSET) 341, and 1.75V which is a preset first reference voltage (GVA_VREGT_VR) 401. Referring to the mathematical equation 1, it can be seen that 7.02V+(Δ) may be obtained as the first gamma reference voltage (VREGT) 403 by using an equation, 4×(1.75+0.25 (ELVDD+Δ)−(ELVDD/4−0.005))=7.02V+(Δ).

Next, referring to a third row in Table 3, when the selected GVA weight is 0.6, GVA_WEIGHT[2:0] 510 may be "HLL". In this case, since GVA_WEIGHT[2] is "H", and GVA_WEIGHT[1:0] (301) is "LL", the first switch 331 of the gamma reference voltage generating unit 134 may be turned off and the second switch 332 may be turned on. In addition, the MUX 320 may receive "LL" as a control signal, and may provide (×0.15) ELVDD_D or (×0.15) (ELVDD+Δ) corresponding to "LL" to the first gamma reference voltage generator 410.

The first gamma reference voltage generator 410 may generate the first gamma reference voltage (VREGT) 403 by using the mathematical equation 1, with an input of (×0.15) (ELVDD+Δ) which is the boosted or reduced pixel driving voltage (ELVDD_REF) 311, ELVDD/4−0.005 which is the offset voltage (ELVDD_OFFSET) 341, and 2.21V, which is a preset first reference voltage (GVA_VREGT_VR) 401. Referring to the mathematical equation 1, when an initial pixel driving voltage (ELVDD) output from the power supply 110 is 4.6V, 7.02V+(0.6Δ) may be generated as the first gamma reference voltage (VREGT) 403 by using an equation, 4×(2.21+0.15(ELVDD+Δ)−(ELVDD/4−0.005))=7.02V+(0.6Δ).

When the selected GVA weight in rows 4 through 6 of Table 3 is 0.8, 1.2 or 1.4, the first gamma reference voltage generator 410 may generate 7.02V+(0.8Δ), 7.02V+(1.2Δ), or 7.02V+(1.4Δ), respectively, as provided in the last row in Table 3, as the first gamma reference voltage (VREGT) 403 when the values are calculated in the manner described above.

When the selected GVA weight in Table 4 is 1, 0.6, 0.8, 1.2, or 1.4, the first gamma reference voltage generator 410 may generate 6.98V+(Δ), 6.98V+(0.6Δ), 6.98V+(0.8Δ), 6.98V+(1.2Δ), or 6.98V+(1.4Δ), respectively, as provided in the last row in Table 4, as the first gamma reference voltage (VREGT) 403 when the values are calculated in the manner described above.

When comparing Table 2, Table 3, and Table 4, by adding the offset voltage, it is possible to boost the first gamma reference voltage (VREGT) 403 from 7.0V to 7.02V, or reduce the first gamma reference voltage (VREGT) 403 from 7.0V to 6.98V. By doing so, it is possible to remove the offset which may be present in the circuit which generates the gamma voltage.

Figure 6:
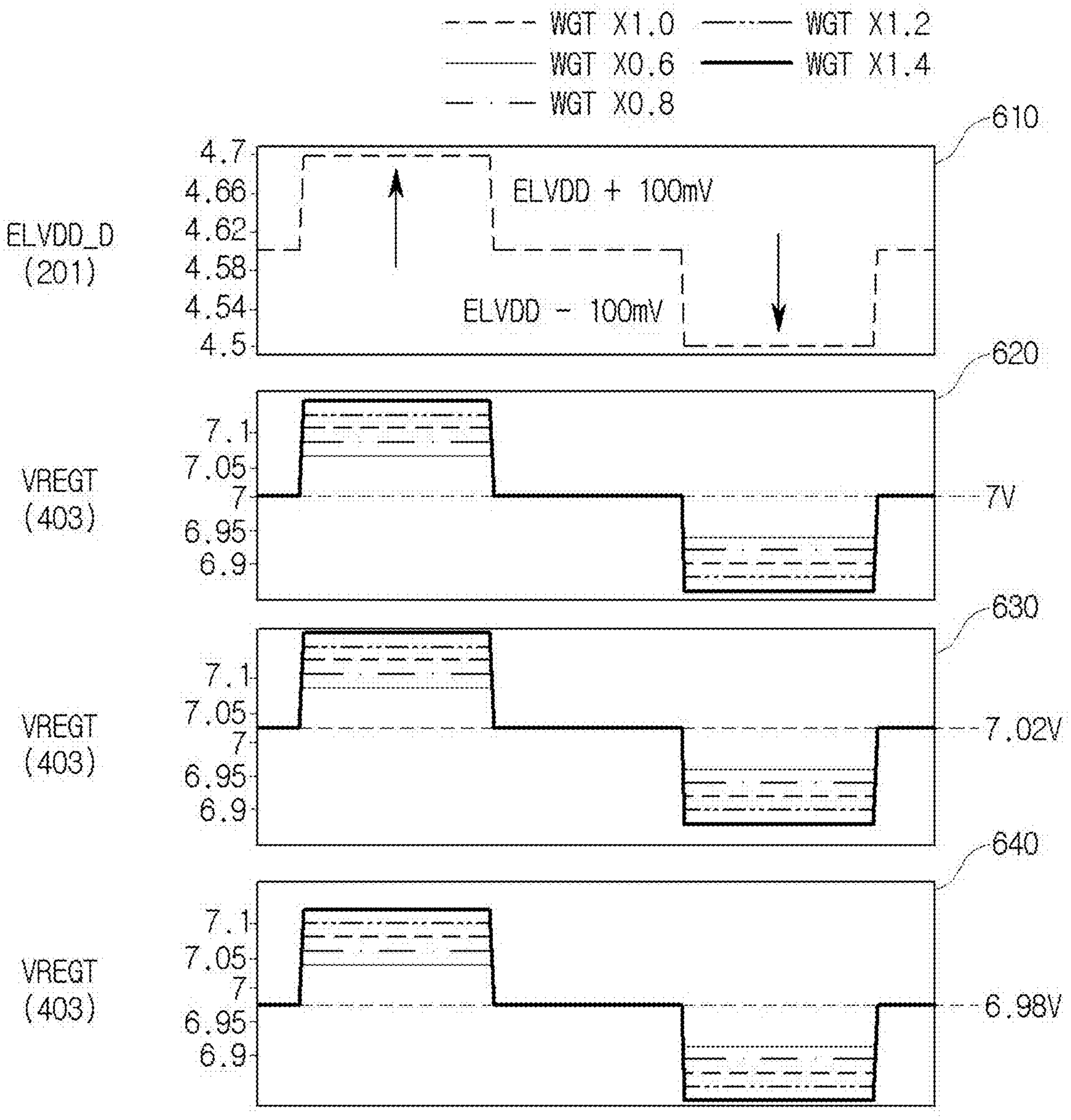
FIG. 6 illustrates an example of a first gamma reference voltage (VREGT) per GVA weight and offset voltage according to change of a pixel driving voltage (ELVDD) of Table 2 to Table 4.

FIG. 6 illustrates an example of the first gamma reference voltage (VREGT) 403 per GVA weight and offset voltage according to change of the pixel driving voltage (ELVDD) of Table 2 to Table 4.

610 of FIG. 6 shows a case in which the pixel driving voltage ELVDD is changed, and 620 shows a case in which the first gamma reference voltage (VREGT) 403 is changed to a different value according to the GVA weight. In addition, each of 630 and 640 shows a case in which the first gamma reference voltage (VREGT) 403 is changed to a different voltage according to the GVA weight and the offset voltage.

Table 5 through Table 7 illustrate examples of generating a second gamma reference voltage (VREGB) 413 based on the GVA weight and the offset voltage as an example of the present disclosure.

Table 5 is an example of the second gamma reference voltage (VREGB) 413 generated according to the GVA weights when the offset voltage is 0V, Table 6 is an example of the second gamma reference voltage (VREGB) 413 generated according to the GVA weights when the offset voltage is 20 mV, and Table 7 is an example of the second gamma reference voltage (VREGB) 413 generated according to the GVA weights when the offset voltage is −20 mV.

TABLE 5

| GVA_ WEIGHT[2:0] | ELVDD_ REF | ELVDD_ OFFSET | GVA_ VREGB_VR | VREGB |
|---|---|---|---|---|
| LXX(Default) | (ELVDD + Δ) × 0.25 | ELVDD/4 | 0.50 V | 2.0 V + (Δ) |
| HLL(×0.6) | (ELVDD + Δ) × 0.15 | ELVDD/4 | 0.96 V | 2.0 V + (0.6Δ) |
| HLH(×0.8) | (ELVDD + Δ) × 0.20 | ELVDD/4 | 0.73 V | 2.0 V + (0.8Δ) |
| HHL(×1.2) | (ELVDD + Δ) × 0.30 | ELVDD/4 | 0.27 V | 2.0 V + (1.2Δ) |
| HHH(×1.4) | (ELVDD + Δ) × 0.35 | ELVDD/4 | 0.04 V | 2.0 V + (1.4Δ) |

TABLE 6

| GVA_ WEIGHT[2:0] | ELVDD_ REF | ELVDD_ OFFSET | GVA_ VREGB_VR | VREGB |
|---|---|---|---|---|
| LXX(Default) | (ELVDD + Δ) × 0.25 | ELVDD/4 − 0.005 | 0.50 V | 2.02 V + (Δ) |
| HLL(×0.6) | (ELVDD + Δ) × 0.15 | ELVDD/4 − 0.005 | 0.96 V | 2.02 V + (0.6Δ) |
| HLH(×0.8) | (ELVDD + Δ) × 0.20 | ELVDD/4 − 0.005 | 0.73 V | 2.02 V + (0.8Δ) |
| HHL(×1.2) | (ELVDD + Δ) × 0.30 | ELVDD/4 − 0.005 | 0.27 V | 2.02 V + (1.2Δ) |
| HHH(×1.4) | (ELVDD + Δ) × 0.35 | ELVDD/4 − 0.005 | 0.04 V | 2.02 V + (1.4Δ) |

TABLE 7

| GVA_ WEIGHT[2:0] | ELVDD_ REF | ELVDD_ OFFSET | GVA_ VREGB_VR | VREGB |
|---|---|---|---|---|
| LXX(Default) | (ELVDD + Δ) × 0.25 | ELVDD/4 + 0.005 | 0.50 V | 1.98 V + (Δ) |
| HLL(×0.6) | (ELVDD + Δ) × 0.15 | ELVDD/4 + 0.005 | 0.96 V | 1.98 V + (0.6Δ) |
| HLH(×0.8) | (ELVDD + Δ) × 0.20 | ELVDD/4 + 0.005 | 0.73 V | 1.98 V + (0.8Δ) |
| HHL(×1.2) | (ELVDD + Δ) × 0.30 | ELVDD/4 + 0.005 | 0.27 V | 1.98 V + (1.2Δ) |
| HHH(×1.4) | (ELVDD + Δ) × 0.35 | ELVDD/4 + 0.005 | 0.04 V | 1.98 V + (1.4Δ) |

In Table 5 through Table 7, the pixel driving voltage (ELVDD_D) 201 is a value (ELVDD+Δ) obtained by adding a change to the initial pixel driving voltage (ELVDD) (e.g., 4.6V) output from the power supply 110. In addition, when the offset voltage is 0V, 20 mV, or −20 mV, the offset voltage (ELVDD_OFFSET) is ELVDD/4, ELVDD/4−0.005, or ELVDD/4+0.005, respectively. These values are obtained by specifying the coefficient β of 4 in the description above.

Referring to a second row in Table 5, when the selected GVA weight is 1, GVA_WEIGHT[2:0] 510 may be "LXX". In this case, referring to FIG. 3, since GVA_WEIGHT[2] is "L", the first switch 331 of the gamma reference voltage generating unit 134 may be turned on and the second switch 332 may be turned off. Accordingly, the first switch 331 may provide (×0.25) ELVDD_D or (×0.25) (ELVDD+Δ) provided from the voltage divider circuit 310 to the second gamma reference voltage generator 420.

The second gamma reference voltage generator 420 may generate the second gamma reference voltage (VREGB) 413 by using the mathematical equation 3, with an input of (×0.25) (ELVDD+Δ) which is the boosted or reduced pixel driving voltage (ELVDD_REF) 311, ELVDD/4 which is the offset voltage (ELVDD_OFFSET) 341, and 0.50V which is a preset second reference voltage (GVA_VREGB_VR) 411. Referring to the mathematical equation 3, it can be seen that 2.0V+(Δ) may be obtained as the second gamma reference voltage (VREGB) 413 by using an equation, 4×(0.50+0.25(ELVDD+Δ)−ELVDD/4)=2.0V+(Δ).

Next, referring to a third row in Table 5, when the selected GVA weight is 0.6, GVA_WEIGHT[2:0] 510 may be "HLL". In this case, since GVA_WEIGHT[2] is "H" and GVA_WEIGHT[1:0] (301) is "LL", the first switch 331 of the gamma reference voltage generating unit 134 may be turned off and the second switch 332 may be turned on. In addition, the MUX 320 may receive "LL" as a control signal, and may provide (×0.15) ELVDD_D or (×0.15) (ELVDD+Δ) corresponding to "LL" to the second gamma reference voltage generator 420.

The second gamma reference voltage generator 420 may generate the second gamma reference voltage (VREGB) 413 by using the mathematical equation 3, with an input of (×0.15) (ELVDD+Δ) which is the boosted or reduced pixel driving voltage (ELVDD_REF) 311, ELVDD/4 which is the offset voltage (ELVDD_OFFSET) 341, and 0.96V which is a preset second reference voltage (GVA_VREGB_VR) 411. Referring to the mathematical equation 3, when an initial pixel driving voltage (ELVDD) output from the power supply 110 is 4.6V, 2.0V+(0.6Δ) may be generated as the second gamma reference voltage (VREGB) 413 by using an equation, 4×(0.96+0.15(ELVDD+Δ)−ELVDD/4)=2.0V+(0.6Δ).

When the selected GVA weight in the fourth to sixth rows of Table 5 is 0.8, 1.2 or 1.4, the second gamma reference voltage generator 420 may generate 2.0V+(0.8Δ), 2.0V+(1.2Δ), or 2.0V+(1.4Δ), respectively, as provided in the last row in Table 5, as the second gamma reference voltage (VREGB) 413 when calculating the value in the manner provided above.

Referring to a second row in Table 6, when the selected GVA weight is 1, GVA_WEIGHT[2:0] 510 may be "LXX". In this case, referring to FIG. 3, since GVA_WEIGHT[2] is "L", the first switch 331 of the gamma reference voltage generating unit 134 may be turned on and the second switch 332 may be turned off. Accordingly, the first switch 331 may provide (×0.25) ELVDD_D or (×0.25) (ELVDD+Δ) provided from the voltage divider circuit 310 to the second gamma reference voltage generator 420.

The second gamma reference voltage generator 420 may generate the second gamma reference voltage (VREGB) 413 using the mathematical equation 3, with an input of (×0.25) (ELVDD+Δ) which is the boosted or reduced pixel driving voltage (ELVDD_REF) 311, ELVDD/4−0.005 which is the offset voltage (ELVDD_OFFSET) 341, and 0.50V which is a preset second reference voltage (GVA_VREGB_VR) 411. Referring to the mathematical equation 3, it can be seen that 2.02V+(Δ) may be obtained as the second gamma reference voltage (VREGB) 413 by using an equation, 4×(0.50+0.25(ELVDD+Δ)−(ELVDD/4−0.005))=2.02V+(Δ).

Next, referring to the third row of Table 6, if the selected GVA weight is 0.6, then GVA_WEIGHT[2:0] 510 may be "HLL". In this case, since GVA_WEIGHT[2] is "H" and GVA_WEIGHT[1:0] (301) is "LL", the first switch 331 of the gamma reference voltage generating unit 134 may be turned off and the second switch 332 may be turned on. In addition, the MUX 320 may receive "LL" as a control signal, and may provide (×0.15) ELVDD_D or (×0.15) (ELVDD+Δ) corresponding to "LL" to the second gamma reference voltage generator 420.

The second gamma reference voltage generator 420 may generate the second gamma reference voltage (VREGB) 413 by using the mathematical equation 3, with an input of (×0.15) (ELVDD+Δ) which is the boosted or reduced pixel driving voltage (ELVDD_REF) 311, ELVDD/4−0.005 which is the offset voltage (ELVDD_OFFSET) 341, and 0.96V which is a preset second reference voltage (GVA_VREGB_VR) 411. Referring to the mathematical equation 3, when an initial pixel driving voltage (ELVDD) output from the power supply 110 is 4.6V, 2.0V+(0.6Δ) may be generated as the second gamma reference voltage (VREGB) 413 by using an equation, 4×(0.96+0.15(ELVDD+Δ)−(ELVDD/4−0.005))=2.02V+(0.6Δ).

When the selected GVA weight in rows 4 through 6 of Table 6 is 0.8, 1.2 or 1.4, the second gamma reference voltage generator 420 may generate 2.02V+(0.8Δ), 2.02V+(1.2 Δ), or 2.02V+(1.4Δ), respectively, as provided in the last row of Table 6, as the second gamma reference voltage (VREGB) 413 when the values are calculated in the manner described above.

When the selected GVA weight in Table 7 is 1, 0.6, 0.8, 1.2, or 1.4, the second gamma reference voltage generator 420 may generate 1.98V+(Δ), 1.98V+(0.6Δ), 1.98V+(0.8Δ), 1.98V+(1.2Δ), or 1.98V+(1.4Δ), respectively, as provided in the last row of Table 7, as the second gamma reference voltage (VREGB) 413 when the values are calculated in the above manner.

When comparing Table 5, Table 6, and Table 7, it can be seen that by adding the offset voltage, the second gamma reference voltage (VREGB) 413 can be boosted from 2.0V to 2.02V, or the second gamma reference voltage (VREGB) 413 can be reduced from 2.0V to 1.98V. This can eliminate any offset that may exist in the circuitry that generates the gamma voltage.

Figure 7:
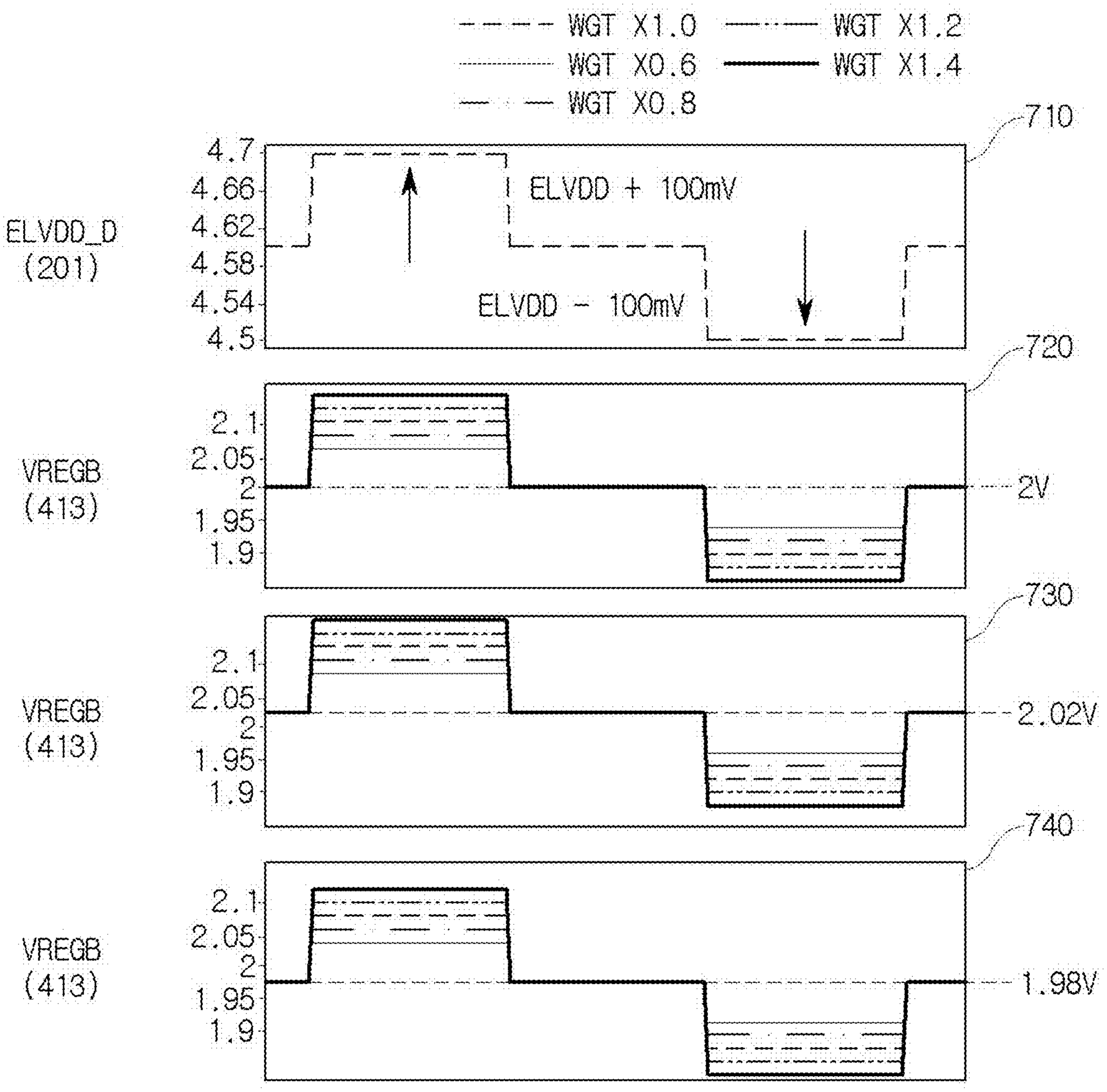
FIG. 7 illustrates an example of a second gamma reference voltage (VREGB) per GVA weight and offset voltage according to change of a pixel driving voltage (ELVDD) of Table 5 to Table 7.

FIG. 7 illustrates an example of the second gamma reference voltage (VREGB) 413 per GVA weight and offset voltage according to change of the pixel driving voltage (ELVDD) of Table 5 through Table 7.

710 of FIG. 7 illustrates a case in which the pixel driving voltage ELVDD is changed, and a 720 illustrates a case in which the second gamma reference voltage (VREGB) 413 is changed to a different value according to the GVA weight. In addition, each of 730 and 740 illustrates a case in which the second gamma reference voltage (VREGB) 413 is changed to a different voltage according to the GVA weight and the offset voltage.

Figure 8:
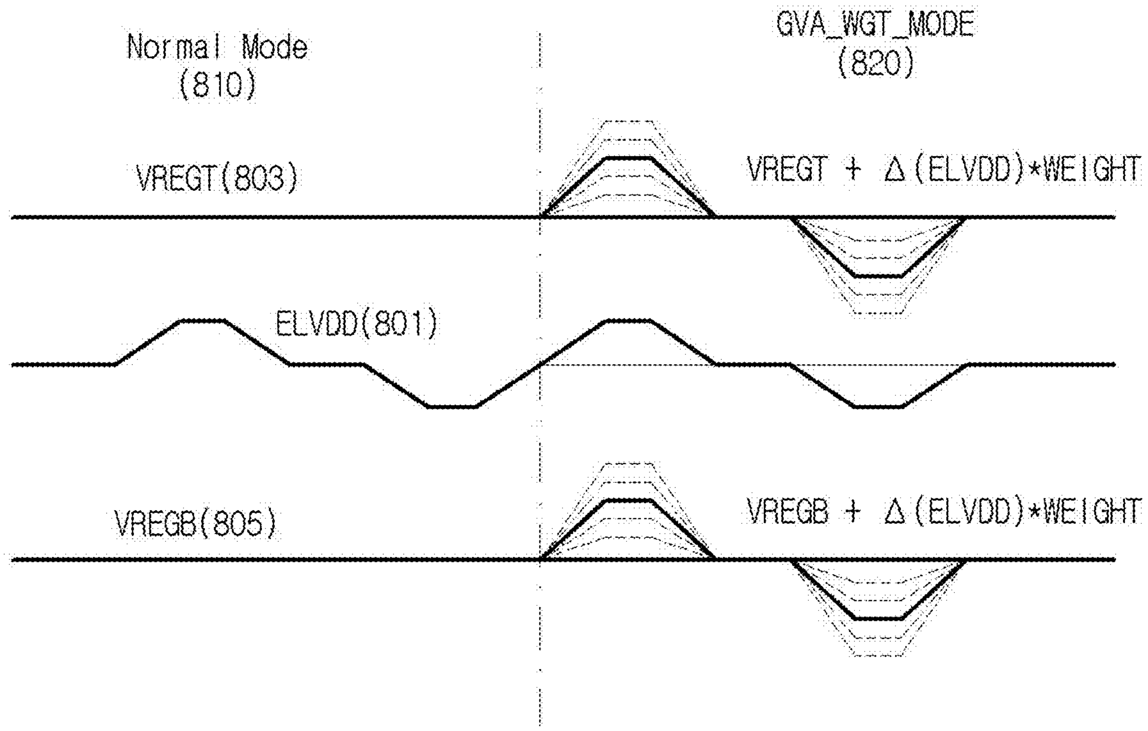
FIG. 8 illustrates an example of a gamma reference voltage generated according to change of a pixel driving voltage (ELVDD) in cases to which a GVA weight according to various embodiments of the present disclosure is applied and to which a GVA weight is not applied.

FIG. 8 illustrates an example of the gamma reference voltage generated according to change of the pixel driving voltage (ELVDD) in cases to which the GVA weight according to various embodiments of the present disclosure is applied and to which a GVA weight is not applied. Here, the case to which the GVA weight is applied is referred to as a GVA weight mode (GVA_WGT_MODE) 820, and the case to which the GVA weight is not applied is referred to as a normal mode (Normal Mode) 810. The normal mode may be a conventional scheme.

Referring to FIG. 8, in conventional mode 810, the upper limit gamma reference voltage (VREGT) 803 and lower limit gamma reference voltage (VREGB) 805 used to generate the gamma voltage of the DAC remain constant regardless of changes in the pixel driving voltage (ELVDD) 801.

Conversely, in the case of the GVA weight mode (GVA_WGT_MODE) 820, according to various embodiments of the present disclosure, the upper limit gamma reference voltage (VREGT) 803 and the lower limit gamma reference voltage (VREGB) 805, which are used for generating the gamma voltage of the DAC, may be changed according to the GVA weight, when the pixel driving voltage (ELVDD) 801 is changed.

That is, in various embodiments of the present disclosure, the gamma voltage of the DAC can be adjusted by applying the GVA weight according to changes in the pixel driving voltage so that the analog voltage of the DAC is changed, thereby preventing the luminance from changing in response to changes in the pixel driving voltage.

Figure 9:
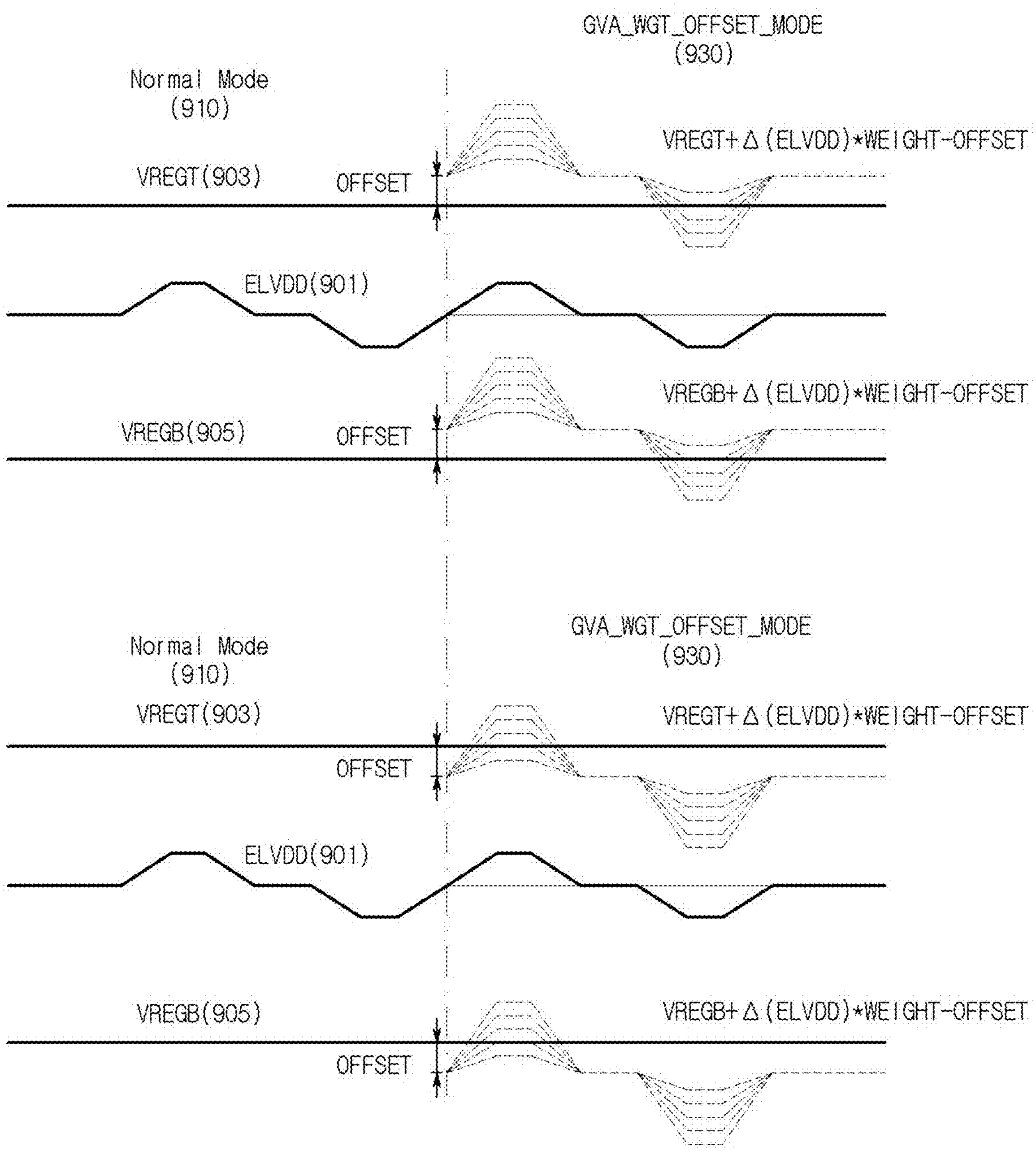
FIG. 9 illustrates an example of a gamma reference voltage generated according to change of a pixel driving voltage (ELVDD) in cases to which a GVA weight and an offset voltage according to various embodiments of the present disclosure are applied and to which a GVA weight is not applied.

FIG. 9 illustrates an example of the gamma reference voltage generated according to a change in pixel driving voltage (ELVDD) when GVA weights and offset voltages are applied and when GVA weights and offset voltages are not applied, according to various embodiments of the present disclosure. Here, the case where GVA weights and offset voltages are applied is referred to as GVA weight offset mode (GVA_WGT_OFFSET_MODE) 930, and the case where GVA weights and the offset voltages are not applied is referred to as normal mode (Normal Mode) 910. The normal mode may be conventional.

Referring to FIG. 9, for the conventional mode 910, the upper limit gamma reference voltage (VREGT) 903 and lower limit gamma reference voltage (VREGB) 905, which are used for generating the gamma voltage of the DAC remain constant regardless of changes in the pixel driving voltage (ELVDD) 901.

Conversely, for the GVA weight offset mode (GVA_WGT_OFFSET_MODE) 930 according to various embodiments of the present disclosure, upon applying the offset voltage, the upper limit gamma reference voltage (VREGT) 903 and the lower limit gamma reference voltage (VREGB) 905, which are used for generating the gamma voltage of the DAC, are changed according to the GVA weight, when the pixel driving voltage (ELVDD) 901 is changed, and all voltages may be boosted or reduced by as much as the set offset voltage.

In other words, according to the various embodiments of the present disclosure, it is possible to adjust the gamma voltage of the DAC by applying a GVA weight in response to changes in the pixel driving voltage, and further correct the gamma voltage by applying an offset voltage to cause the analog voltage of the DAC to change, thereby preventing the luminance from changing in response to changes in the pixel driving voltage.

Figure 10:
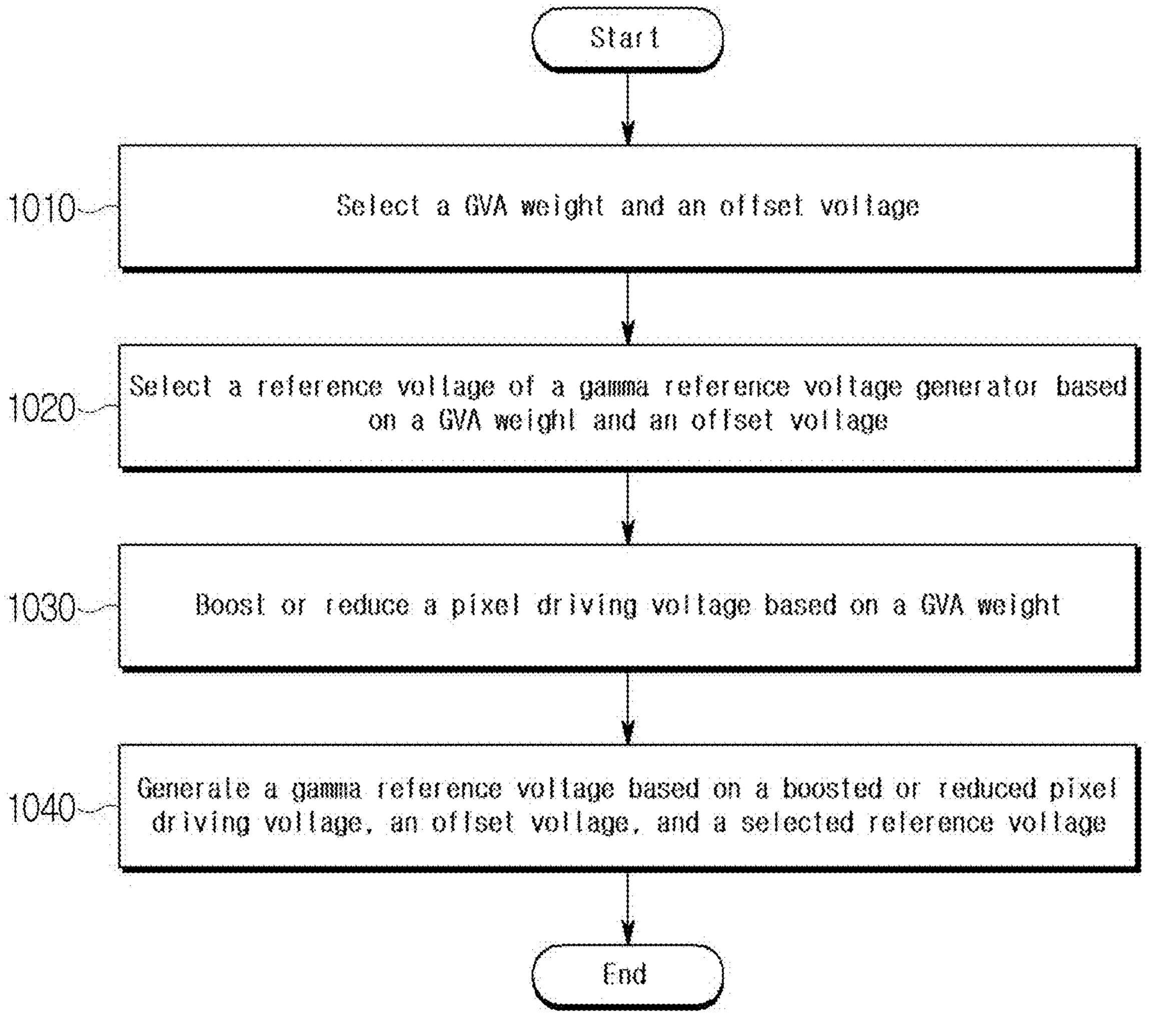
FIG. 10 illustrates a flowchart for adjusting a gamma voltage in a display device according to various embodiments of the present disclosure.

FIG. 10 illustrates a flowchart for adjusting a gamma voltage in a display device according to various embodiments of the present disclosure.

Referring to FIG. 10, in operation 1010, the weight selector 132 may select a GVA weight based on the amount of change in the pixel driving voltage caused by the load. The GVA weight may mean a weight for adjusting the gamma voltage. For example, the weight selector 132 may select a GVA weight in response to recognizing that a load inside the display device boosts or reduces the pixel driving voltage output from the power supply 110. According to an example, the weight selector 132 may select the GVA weight based on a difference between the pixel driving voltage (e.g., ELVDD) output from the power supply 110 and the pixel driving voltage (e.g., ELVDD_D=ELVDD±α) input to the driver IC 130. According to an example, the weight selector 132 may select the GVA weight based on a difference between the pixel driving voltage (e.g., ELVDD_D=ELVDD±α) input to the driver IC 130 after being changed by the load between power supply 110 and the driver IC 130, and the pixel driving voltage (e.g., ELVDD_P=ELVDD+2α) input to the display panel 120 after being changed by the load between the power supply 110 and the display panel 120. The GVA weight may be any of 0.6, 0.8, 1.0, 1.2, and 1.4, for example.

In addition, the weight selector 132 may not only select the GVA weight for adjusting the gamma voltage, but also, set the offset voltage for additionally correcting the gamma voltage. When the offset voltage is set, the gamma voltages, as a whole, may rise or drop by as much as the set offset voltage.

In operation 1020, the gamma reference voltage generating unit 134 may select the reference voltage of the gamma reference voltage generator 220 based on the selected GVA weight and the offset voltage. According to an example, the gamma reference voltage generating unit 134 may select the first reference voltage (GVA_VREGT_VR) 401 to be input to the first gamma reference voltage generator 410 and the second reference voltage (GVA_VREGB_VR) 411 to be input to the second gamma reference voltage generator 420, based on a pre-stored table for a reference voltage for each GVA weight, as illustrated in FIG. 5.

In operation 1030, the gamma reference voltage generating unit 134 may boost or reduce the pixel driving voltage (ELVDD_REF) to be input to the gamma reference voltage generator 220, based on the selected GVA weight. According to an example, it is possible to boost or reduce the pixel driving voltage by a specified multiple, based on the GVA_WEIGHT[2:0] signal corresponding to the selected GVA weight. The specified multiple may be a quarter of the GVA weight which corresponds to the GVA_WEIGHT[2:0] signal. For example, when the selected GVA weight is 1, the pixel driving voltage may be boosted or reduced by 0.25 times. As another example, when the selected GVA weight is 0.6, the pixel driving voltage may be boosted or reduced by 0.15 times. According to an example, the gamma reference voltage generating unit 134 may boost or reduce the pixel driving voltage by a specified multiple based on the selected VGA weight by using the voltage divider circuit 310, the MUX 320, the first switch 331, and the second switch 332.

In operation 1040, the gamma reference voltage generating unit 134 may generate the gamma reference voltage based on the boosted or reduced pixel driving voltage and the selected reference voltage. According to an example, the gamma reference voltage generating unit 134 may generate the first gamma reference voltage 403, which is the upper limit value of the gamma reference voltage and the second gamma reference voltage 413, which is the lower limit value of the gamma reference voltage, using the first gamma reference voltage generator 410 and the second gamma reference voltage generator 420. For example, the gamma reference voltage generating unit 134 may generate the first gamma reference voltage (VREGT) 403, using the first gamma reference voltage generator 410 which receives the boosted or reduced pixel driving voltage (ELVDD_REF) 311, the offset voltage (ELVDD_OFFSET) 341, and the first reference voltage (GVA_VREGT_VR) 401. The first gamma reference voltage generator 410 may generate the first gamma reference voltage (VREGT) 403 based on the mathematical equation 1. The gamma reference voltage generating unit 134 may generate the second gamma reference voltage (VREGB) 413, using the second gamma reference voltage generator 420 which receives the boosted or reduced pixel driving voltage (ELVDD_REF) 311, the offset voltage (ELVDD_OFFSET) 341, and the second reference voltage (GVA_VREGB_VR) 411. The second gamma reference voltage generator 420 may generate the second gamma reference voltage (VREGB) 413 based on the mathematical equation 3.

The first gamma reference voltage (VREGT) 403 and the second gamma reference voltage (VREGB) 413, which are generated as described above, may be used to generate and output a gamma voltage of the DAC at the gamma voltage output unit 136.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A display device, comprising:

a display panel comprising a plurality of pixels;

a driver IC configured to convert digital data corresponding to an input image to an analog voltage using a gamma voltage, and to supply the analog voltage to the plurality of pixels; and a power supply configured to supply a pixel driving voltage to the display panel and the driver IC, wherein the driver IC comprises:

a weight selector configured to select a weight for adjusting the gamma voltage based on a change amount of the pixel driving voltage supplied from the power supply; and a gamma reference voltage generating unit configured to generate a gamma reference voltage based on the selected weight, and wherein the gamma reference voltage generating unit generates the gamma reference voltage using a reference voltage corresponding to the selected weight, the reference voltage being determined based on a table indicating at least one reference voltage corresponding to the selected weight.

2. The display device of claim 1, wherein the gamma reference voltage generating unit comprises:

a weight circuit configured to boost or reduce the pixel driving voltage by a specified multiple based on the selected weight; and a gamma reference voltage generator configured to generate the gamma reference voltage based on the boosted or reduced pixel driving voltage, a preset offset voltage, and the reference voltage corresponding to the selected weight.

3. The display device of claim 2, wherein the weight circuit comprises:

a buffer configured to buffer the preset offset voltage;

a voltage divider circuit configured to divide the pixel driving voltage using a plurality of series-connected resistor elements;

a multiplexer connected to the voltage divider circuit and configured to select one of the divided pixel driving voltage from the voltage divider circuit according to a first control signal generated based on the selected weight and output the selected pixel driving voltage;

a first switch connected between the voltage divider circuit and the gamma reference voltage generator and configured to be turned on or off by a second control signal generated based on the selected weight; and a second switch connected between the multiplexer and the gamma reference voltage generator and configured to be turned on or off by the second control signal.

4. The display device of claim 3, wherein the second control signal selectively turns on one of the first switch and the second switch.

5. The display device of claim 2, wherein the gamma reference voltage generator comprises:

a first gamma reference voltage generator configured to generate a first gamma reference voltage based on the boosted or reduced pixel driving voltage, the preset offset voltage and a first reference voltage corresponding to the selected weight; and a second gamma reference voltage generator configured to generate a second gamma reference voltage based on the boosted or reduced pixel driving voltage, the preset offset voltage and a second reference voltage corresponding to the selected weight.

6. The display device of claim 5, wherein the first gamma reference voltage is an upper limit value of the gamma voltage, and wherein the second gamma reference voltage is a lower limit value of the gamma voltage.

7. The display device of claim 1, wherein the weight is determined by a difference between the pixel driving voltage output from the power supply and the pixel driving voltage input to the driver IC.

8. The display device of claim 1, wherein the weight is determined by a difference between the pixel driving voltage input to the driver IC and the pixel driving voltage input to the display panel.

9. The display device of claim 1, wherein the driver IC further comprises a gamma voltage output unit configured to generate and output the gamma voltage based on the gamma reference voltage.

10. A method for operating a display device, the method comprising:

selecting a weight for adjusting a gamma voltage of a digital-to-analog converter (DAC) based on a change amount of a pixel driving voltage supplied from a power supply;

generating a gamma reference voltage which is used to generate the gamma voltage based on the selected weight, wherein the gamma reference voltage is generated using a reference voltage corresponding to the selected weight, the reference voltage being determined based on a table indicating at least one reference voltage corresponding to the selected weight; and adjusting the gamma voltage using the generated gamma reference voltage.

11. The method of claim 10, wherein the generating of the gamma reference voltage comprises:

boosting or reducing the pixel driving voltage by a specified multiple based on the selected weight; and generating the gamma reference voltage based on the boosted or reduced pixel driving voltage, a preset offset voltage, and the reference voltage corresponding to the selected weight.

12. The method of claim 11, wherein the pixel driving voltage is boosted or reduced by the specified multiple using a voltage divider circuit comprising a plurality of series-connected resistor elements and configured to divide the pixel driving voltage, and wherein the voltage divider circuit is connected to a multiplexer.

13. The method of claim 12, wherein the multiplexer is configured to operate according to a control signal generated based on the selected weight.

14. The method of claim 11, wherein the generating of the gamma reference voltage comprises:

generating a first gamma reference voltage based on the boosted or reduced pixel driving voltage, the preset offset voltage, and a first reference voltage corresponding to the selected weight; and generating a second gamma reference voltage based on the boosted or reduced pixel driving voltage, the preset offset voltage, and a second reference voltage corresponding to the selected weight.

15. The method of claim 14, wherein the first gamma reference voltage is an upper limit value of the gamma voltage, and wherein the second gamma reference voltage is a lower limit value of the gamma voltage.

16. The method of claim 10, wherein the selecting of the weight comprises:

determining the weight based on a difference between the pixel driving voltage output from the power supply and the pixel driving voltage input to a driver IC.

17. The method of claim 10, wherein the selecting of the weight comprises:

determining the weight based on a difference between the pixel driving voltage input to a driver IC and the pixel driving voltage input to a display panel.

* * * * *